United States Patent
Crowley, II

(10) Patent No.: US 6,672,401 B1
(45) Date of Patent: Jan. 6, 2004

(54) TOWABLE BOX GRADER WITH ELECTRONICALLY CONTROLLED CONTINUOUSLY VARIABLE MULTI-AXIS BLADE SYSTEM

(75) Inventor: Robert W. Crowley, II, Land O' Lakes, FL (US)

(73) Assignee: Southern Laser, Inc., Lutz, FL (US)

( * ) Notice: Subject to any disclaimer, the term of this patent is extended or adjusted under 35 U.S.C. 154(b) by 0 days.

(21) Appl. No.: 10/170,518

(22) Filed: Jun. 13, 2002

(51) Int. Cl.$^7$ .............................. E02F 3/76; E02F 3/815
(52) U.S. Cl. .................... 172/799.5; 172/797; 172/825; 172/828; 172/4.5
(58) Field of Search .................... 172/780, 781, 172/779, 783, 791, 4.5, 795, 797, 799.5, 452, 663, 664, 666, 810, 811, 824, 825, 828, 830; 37/435

(56) References Cited

U.S. PATENT DOCUMENTS

| | | | | |
|---|---|---|---|---|
| 3,735,818 A | * | 5/1973 | Swisher et al. ............. | 172/785 |
| 4,061,194 A | * | 12/1977 | McCanse ................. | 172/260.5 |
| 4,124,080 A | * | 11/1978 | McCanse ................. | 172/445.2 |
| 4,213,507 A | * | 7/1980 | Horrer et al. ............. | 172/784 |
| 4,279,312 A | * | 7/1981 | Pyle ....................... | 172/789 |
| 4,411,323 A | * | 10/1983 | Doss ...................... | 172/799.5 |
| 4,895,440 A | * | 1/1990 | Cain et al. ................. | 356/5.08 |
| 4,898,247 A | * | 2/1990 | Springfield .............. | 172/799.5 |
| 4,930,582 A | * | 6/1990 | Goss ......................... | 172/788 |
| 4,999,022 A | * | 3/1991 | Veys ......................... | 414/718 |
| 5,427,185 A | * | 6/1995 | Seal ........................ | 172/684.5 |
| 5,562,365 A | * | 10/1996 | Berrange ................... | 405/271 |
| 5,890,546 A | * | 4/1999 | Kerpash, Sr. ............ | 172/684.5 |
| 5,911,279 A | * | 6/1999 | Whitener .................... | 172/668 |
| 6,041,528 A | * | 3/2000 | Broach ....................... | 37/431 |
| 6,168,348 B1 | * | 1/2001 | Meyer et al. ................. | 404/90 |

* cited by examiner

Primary Examiner—Robert E. Pezzuto
Assistant Examiner—Alexandra K. Pechhold
(74) Attorney, Agent, or Firm—Akerman Senterfitt, P.A.

(57) ABSTRACT

A towable scraper system for contour surface grading. The system includes a rigid chassis member that has a coupler configured for attachment to a conventional three-point tractor hitch. A scraper blade is pivotally suspended from the rigid chassis member and is equipped with a blade motivator for causing an angular rotation of the blade around an axis aligned with a towing direction. A lift assembly raises and lowers the rigid chassis member to control a height of the scraper blade relative to a work surface to be graded. The towable scraper system is provided with a carriage assembly that offers rolling support for the rigid chassis as it moves over the work surface. The carriage assembly is pivotally coupled to the rigid chassis at a location opposed to the coupler and is configured for angular rotation around a second axis aligned with the towing direction.

12 Claims, 2 Drawing Sheets

TOWABLE BOX GRADER WITH ELECTRONICALLY CONTROLLED CONTINUOUSLY VARIABLE MULTI-AXIS BLADE SYSTEM

CROSS-REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The invention relates to earth moving equipment and more particularly to an improved surface leveling device.

2. Description of the Related Art

Leveling systems such as scrapers or graders are commonly used to level relatively large areas of ground and are well known in the art. These leveling systems are commonly pushed or pulled by bulldozers, tractors, or other similar equipment.

In recent years laser beam level control systems have become more commonly used with expensive motorgrader and bulldozer leveling systems to robotically control a scraper for producing a ground contour. One such system is available from Topcon Positioning Systems, Inc. of Pleasanton, Calif. These systems provide three-dimensional machine control over the leveling and contouring of a site. A robotic tracking station is provided to communicate directly with a conventional control system on the grading machine. Using either a local positioning system or GPS technology, a computer program containing stored information concerning a desired site contour can robotically control much of the grading operation. Typically, an operator remains with the machine and manages materials, but the robotic system can be used to control the angle and depth of the grader blade. In this way, the system provides a very accurate control capability that greatly improves the efficiency and accuracy of the grading operation.

While the foregoing motorgrader systems have proved highly advantageous, they are also generally used on very large and expensive machines such as motorgraders and bulldozers. Smaller, less expensive operations often make use of smaller, relatively inexpensive box grader devices that are towed behind a conventional tractor utilizing a three-point hitch. Such systems have, in some instances, been adapted to utilize laser-leveling techniques. For example, U.S. Pat. No. 6,168,348 B1 to Meyer et al. discloses such a system. However, these types of towed scraper systems have generally not been adapted to take advantage of existing control technology for performing complex contour robotic grading.

One reason why laser contour grading has not been fully implemented in towed scraper systems is due to the difficulty of integrating a complex multi-axis movable scraper blade with a conventional tractor incorporating a simple three-point hitch system. Because conventional tractors cannot be expected to have the complex electronics and hydraulics to control the multi-axis movable scraper blade, such functions must be incorporated on the towed scraper system. Moreover, the movement of the towed scraper system and associated blade must be such as to accommodate the fixed linkage to the tractor through the conventional three-point hitch.

SUMMARY OF THE INVENTION

The invention concerns a towable scraper system for contour surface grading. The system includes a rigid chassis member that has a coupler configured for attachment to a conventional three-point tractor hitch. A scraper blade is pivotally suspended from the rigid chassis member and is equipped with a blade motivator for causing an angular rotation of the blade around an axis aligned with a towing direction. According to one aspect of the invention, the scraper blade can be configured as a box scraper.

A lift assembly raises and lowers the rigid chassis member to control a height of the scraper blade relative to a work surface to be graded. The towable scraper system is provided with a carriage assembly that offers rolling support for the rigid chassis as it moves over the work surface. The carriage assembly is pivotally coupled to the rigid chassis at a location opposed to the coupler and is configured for angular rotation around a second axis aligned with the towing direction.

According to another aspect of the invention, the blade motivator and the lift assembly are responsive to a control system for continuously varying the angular rotation and the height of the scraper blade for automatically grading a work surface to a predetermined contour. The blade motivator is comprised of a rigid support arm extending above the rigid chassis member and a hydraulic cylinder attached between an upper portion of the rigid support arm and a portion of the scraper blade.

According to another aspect of the invention, the carriage assembly can include a carriage frame with one or more wheel rotatably mounted thereto. The wheel can be designed to pivot on the pivot frame for better tracking in any selected towing direction.

The lift assembly is comprised of a lift frame pivotally connected on a proximal end to the rigid chassis member and on a distal end to the carriage assembly. The lift frame is pivotally connected to the rigid chassis member on a portion of the rigid chassis member opposed from the coupler. The lift assembly can further advantageously include a rigid support extending above the rigid chassis member and a lift motivator. The lift motivator can be a hydraulic cylinder connected between an upper portion of the rigid support and the distal end of the lift frame.

DETAILED DESCRIPTION OF THE PREFERRED EMBODIMENTS

Figure 1:
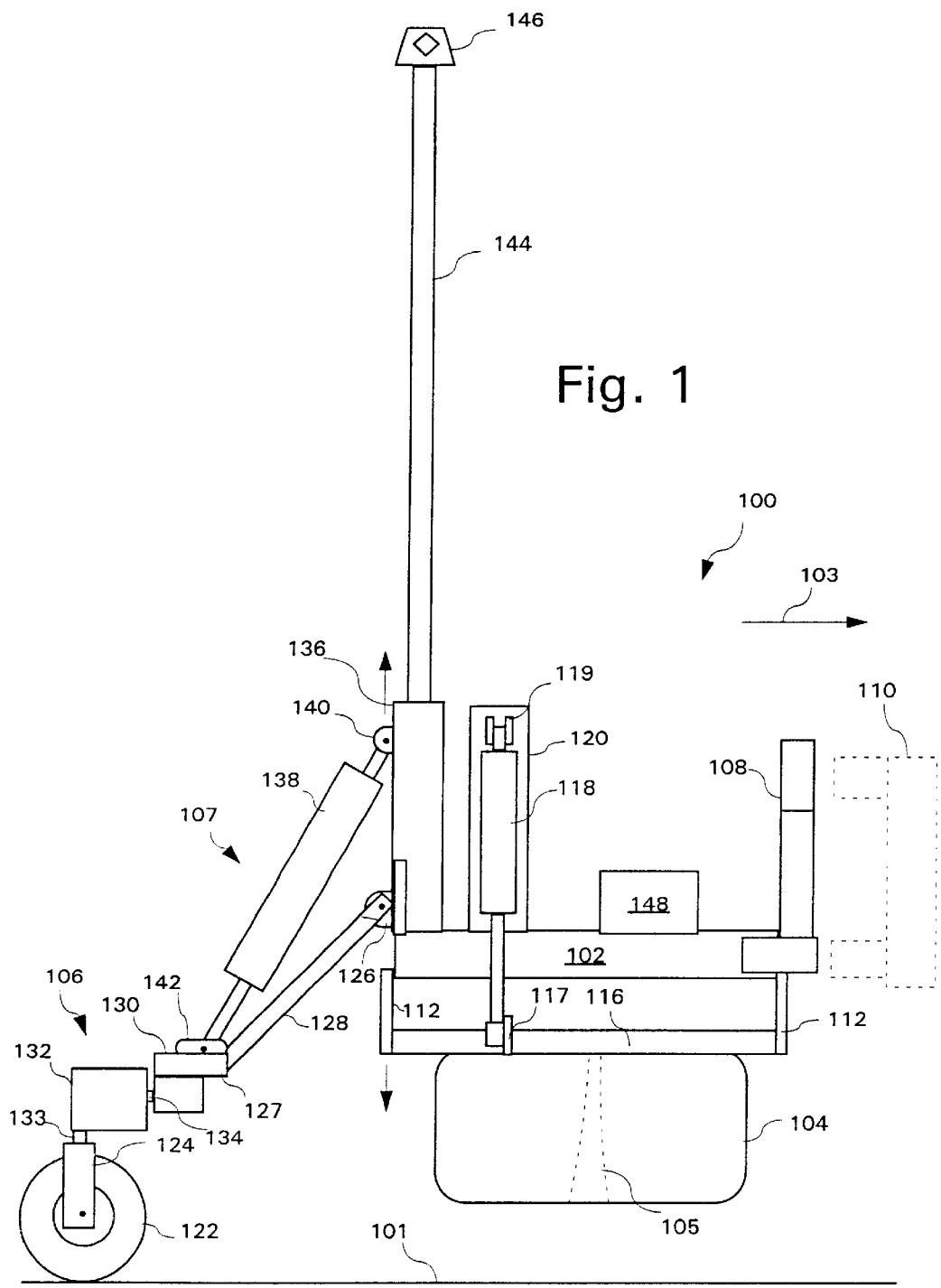
FIG. 1 is a side elevation view of a towable box grader system that is useful for understanding the invention.
Figure 2:
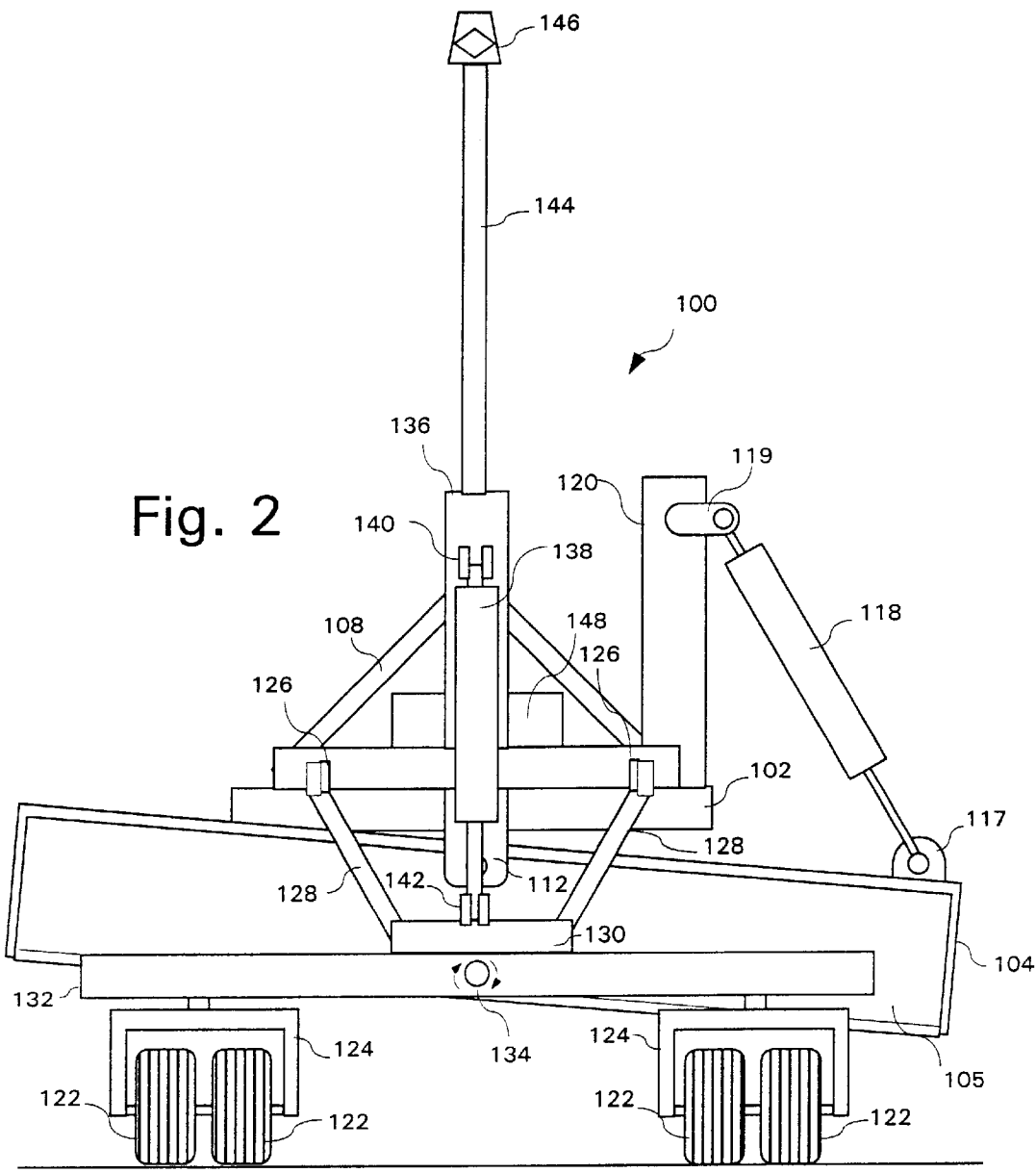
FIG. 2 is a rear view of the towable box grader system of FIG. 1.

A towable scraper system 100 for contour surface grading of a work surface 101 is shown in FIGS. 1 and 2. The scraper system comprises a rigid chassis member 102 having a coupler 108 configured for attachment to a conventional three point tractor hitch 110 (shown in phantom in FIG. 1). A carriage assembly 106 provides rolling support for the rigid chassis member 102 over the work surface. A scraper blade 105 is pivotally suspended from the rigid chassis member 102. The scraper system is configured to be pushed or pulled by a tractor unit over the working surface 101 so as to grade and contour the soil.

As best seen in FIG. 2, the scraper blade 105 pivots relative to the rigid chassis member 102. Any suitable means can be used for pivotally suspending the scraper blade 105. For example, the scraper blade 105 can be suspended from chassis member 102 by a pair of rigid support arms 112. Support arms 112 can pivotally support rotatable member 116 that is rigidly attached to the scraper blade 105 as shown.

A blade motivator is provided for causing an angular rotation of the blade 105 around an axis aligned with a towing direction. In the embodiment of the invention in FIGS. 1 and 2, the blade motivator is comprised of a hydraulic cylinder 118. The hydraulic cylinder 118 is preferably pivotally connected at an upper end to pivot support 119 that is fixed to rigid support arm or stanchion 120. On a lower end, the hydraulic cylinder is pivotally connected to pivot support 117. The pivot support 117 is preferably attached to a box 104 that rigidly supports blade 105. Consequently, extension and retraction of hydraulic cylinder 118 causes blade 105 to rotate about an axis defined by rotatable member 116 that is aligned with a towing direction 103.

The scraper blade 105 can be any suitable rigid blade member configured for moving and collecting soil. According to a preferred embodiment, the scraper blade 105 can be further comprised of box 104 so as to define a box scraper. In that case, the box 104 is preferably open on two sides for scraping in a direction aligned with a towing direction 103. The scraper blade 105 is preferably positioned approximately in the center of the box 104. This configuration advantageously permits the box scraper to be operated along a towing direction 103 and an opposing reverse direction.

Referring once again to FIG. 1, it can be seen that the carriage assembly 106 is pivotally coupled to the rigid chassis 102 at a location opposed from the coupler 108. The carriage assembly includes one or more wheels 122 that are rotatably mounted in wheel frames 124. The wheel frames 124 are mounted to a carriage frame 132 on a wheel pivot member 133 so as to permit the wheels 122 to pivot at different angles for different directions of travel. The carriage frame 132 is configured for rotation on pivot member 134 so as to permit the opposing ends of the elongated carriage frame 132 to ride up and down when the working surface presents uneven surface conditions. Thus, the carriage assembly 106 is configured for angular rotation around a second axis defined by pivot member 134 that is generally aligned with the towing direction 103.

A lift assembly 107 is provided between the carriage assembly 106 and the rigid chassis member 102. The lift assembly 107 raises and lowers the rigid chassis member 102 relative to the carriage assembly 106 so as to control a height of the blade 105 relative to the work surface 101. The lift assembly 107 is comprised of a rigid lift frame 128 that is pivotally attached at a proximal end to the rigid chassis member 102 at a pivot support member 126. An opposing or distal end, the lift frame 128 is pivotally attached to carriage support member 130. For example, the lift frame 128 can be attached to carriage support member 130 at location 127.

The lift assembly 107 also includes a lift motivator for raising and lowering the rigid chassis member relative to the carriage assembly 106. According to a preferred embodiment, the lift motivator can be a hydraulic cylinder 138 as shown in FIGS. 1 and 2. The hydraulic cylinder can be connected at an upper end to pivot support 140 mounted on a rigid support such as lift stanchion 136. At a lower end, the hydraulic cylinder can be pivotally attached to the carriage support member 130 at pivot support 142.

According to a preferred embodiment, the scraper system 100 also includes control unit 148. The control unit 148 is an electro-hydraulic type controller for electronically controlling the actuation of hydraulic cylinders 118 and 138 in response to a control signal. Sensors can be provided for providing system feedback to the control unit 148. The sensors are preferably used to identify the angular rotation position of the blade 105 and the relative lift position of the blade with respect to the carriage assembly 106. The control unit 148 can be controlled manually, for example by an operator, or by means of a computerized three-dimensional machine control system.

If a three-dimensional machine control system is used, the system can be either a remote control type system or an on-board system. If a remote control system is used, one or more transducers 146 can be provided on mast 144 for receiving information concerning the geographic position of the scraper 100 and the desired work surface contour at that location. The transducer(s) 146 can be electro-optical type devices, radio antennas, or any other suitable device useful for aiding in locating the position of the scraper and receiving remote control signals. Various commercially available systems for performing these operations are known in the art.

If an exclusively on-board type control system is used, the control unit 148 can also include a positioning device, such as a GPS system, for determining a location of the scraper. Control unit 148 in that case can also include a microprocessor and suitable memory for storing site contour plan data. The microprocessor can then control the operation of the scraper device in response to the stored site contour plan data to produce the desired topography.

I claim:

1. A towable scraper system for contour surface grading, comprising:
    a rigid chassis member having a coupler configured for attachment to a three point tractor hitch;
    a scraper blade pivotally suspended from said rigid chassis member on a first axis aligned with a towing direction;
    a blade motivator for causing an angular rotation of said blade around said fist axis;
    a lift assembly for raising and lowering said rigid chassis member to control a height of said blade relative to a work surface to be graded;
    a carriage assembly for providing a rolling support for said rigid chassis over said work surface, said carriage assembly pivotally coupled to said rigid chassis on a second axis aligned with said towing direction and at a location opposed to said coupler;
    wherein said carriage assembly is configured for angular rotation around a said second axis.

2. The towable scraper system according to claim 1 wherein said blade motivator and said lift assembly are responsive to a control system for continuously controlling said angular rotation and said height of said scraper blade for automatically grading a work surface to a predetermined contour.

3. The towable scraper system according to claim 1 wherein said blade motivator is comprised of a rigid support arm extending above said rigid chassis member and a hydraulic cylinder attached between an upper portion of said rigid support arm and said scraper blade.

4. The towable scraper system according to claim 1 wherein said carriage assembly comprises a carriage frame with at least one wheel rotatably mounted thereto.

5. The towable scraper system according to claim 4 wherein said at least one wheel is rotatably mounted to a wheel frame and said wheel frame is pivotally mounted to said carriage frame.

6. The towable scraper system according to claim 1 wherein said lift assembly is comprised of a lift frame pivotally connected on a proximal end to said rigid chassis member and rigidly connected on a distal end to said carriage assembly.

7. The towable scraper system according to claim 6 wherein said lift frame is pivotally connected to said rigid chassis member on a portion thereof opposed from said coupler.

8. The towable scraper system according to claim 7 wherein said lift assembly is further comprised of rigid support extending above said rigid chassis member and a hydraulic cylinder connected between an upper portion of said rigid support and said distal end of said lift frame.

9. The towable scraper system according to claim 1 wherein said scraper blade is configured as a box scraper.

10. The towable scraper system according to claim 9 wherein said box scraper is bi-directional.

11. A towable scraper system for contour surface grading, comprising:
   a control system;
   a rigid chassis member having a three-point coupler configured for attachment to a three-point tractor hitch;
   a bi-directional box-scraper blade pivotally suspended from said rigid chassis member on a first axis aligned with a towing direction;
   a blade motivator for causing an angular rotation of said blade around said first axis;
   a lift assembly for raising and lowering said rigid chassis member to control a height of said blade relative to a work surface to be graded, said blade motivator and said lift assembly responsive to said control system for continuously controlling said angular rotation and said height of said bi-directional box scraper blade for automatically grading a work surface to a predetermined contour;
   a carriage assembly for providing a rolling support for said rigid chassis over said work surface, said carriage assembly comprising a carriage frame with at least one wheel frame pivotally mounted thereto, and a wheel rotatably mounted to said wheel frame, said carriage frame pivotally coupled to said rigid chassis on a second axis aligned with said towing direction and at a location opposed to said coupler, said carriage frame configured for angular rotation around a said second axis; and
   wherein said lift assembly is comprised of a lift frame pivotally connected on a proximal end to said rigid chassis member opposed from said coupler, and rigidly attached on a distal end to said carriage assembly.

12. A towable scraper system for contour surface grading, comprising:
   a rigid chassis member having a coupler configured for attachment to a three point tractor hitch;
   a scraper blade pivotally suspended from said rigid chassis member and a blade motivator for causing an angular rotation of said blade around an axis aligned with a towing direction;
   a lift assembly for raising and lowering said rigid chassis member to control a height of said blade relative to a work surface to be graded;
   a carriage assembly for providing a rolling support for said rigid chassis over said work surface, said carriage assembly pivotally coupled to said rigid chassis at a location opposed to said coupler, said carriage assembly configured for angular rotation around a second axis aligned with said towing direction; and
   wherein said blade motivator is comprised of a rigid support arm extending above said rigid chassis member and a hydraulic cylinder attached between an upper portion of said rigid support arm and said scraper blade.

* * * * *